US012804656B2

(12) United States Patent
Yin

(10) Patent No.: US 12,804,656 B2
(45) Date of Patent: Nov. 17, 2026

(54) URLLC UCI MULTIPLEXING ENHANCEMENTS FOR INTRA-UE UPLINK CHANNEL COLLISIONS

(71) Applicant: SHARP KABUSHIKI KAISHA, Sakai City (JP)

(72) Inventor: Zhanping Yin, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 532 days.

(21) Appl. No.: 17/927,024

(22) PCT Filed: May 21, 2021

(86) PCT No.: PCT/JP2021/019309

§ 371 (c)(1),
(2) Date: Nov. 22, 2022

(87) PCT Pub. No.: WO2021/241424

PCT Pub. Date: Dec. 2, 2021

(65) Prior Publication Data

US 2023/0247635 A1 Aug. 3, 2023

Related U.S. Application Data

(60) Provisional application No. 63/031,503, filed on May 28, 2020.

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 72/1263* (2013.01); *H04W 72/54* (2023.01); *H04W 72/566* (2023.01)

(58) Field of Classification Search
None
See application file for complete search history.

(56) References Cited

U.S. PATENT DOCUMENTS 11,758,540 B2 * 9/2023 Lee ........................ H04L 1/1861 370/329
2019/0349973 A1 * 11/2019 Yang ..................... H04L 5/0055
(Continued)

OTHER PUBLICATIONS

3GPP TS 38.214 V15.8.0 (Dec. 2019) 3rd Generation Partnership Project; Technical Specification Group Radio Access Network; NR; Physical layer procedures for data (Release 15).

*Primary Examiner* — Steve R Young
(74) *Attorney, Agent, or Firm* — ScienBiziP, P.C.

(57) ABSTRACT

A method by a UE includes configuring a CSI report for a first service type, the CSI report for the first service type being a URLLC CSI report with a high priority, configuring a plurality of sets of second PUCCH resources for HARQ-ACK for a second service type, determining a first PUCCH resource for the CSI report, determining a second PUCCH resource from the plurality of sets of second PUCCH resources for a HARQ-ACK feedback based on a priority and a payload size of the HARQ-ACK, determining the first PUCCH resource for the CSI report overlaps the second PUCCH resource for the HARQ-ACK feedback, and performing one of a plurality of collision handling procedures based on the priority of the HARQ-ACK and the priority of CSI report.

3 Claims, 6 Drawing Sheets

(51) Int. Cl.

| | |
|---|---|
| ***H04W 72/1263*** | (2023.01) |
| ***H04W 72/54*** | (2023.01) |
| ***H04W 72/566*** | (2023.01) |

(56) References Cited

U.S. PATENT DOCUMENTS

| | | | | |
|---|---|---|---|---|
| 2020/0314900 | A1* | 10/2020 | Hosseini | H04W 72/56 |
| 2021/0058922 | A1* | 2/2021 | Han | H04L 1/1664 |
| 2021/0321394 | A1* | 10/2021 | Li | H04W 72/0446 |
| 2022/0132496 | A1* | 4/2022 | Lu | H04W 72/21 |
| 2022/0191890 | A1* | 6/2022 | Guo | H04L 5/0053 |
| 2022/0217739 | A1* | 7/2022 | Gao | H04L 1/1812 |
| 2022/0279538 | A1* | 9/2022 | Jung | H04W 72/542 |
| 2023/0156685 | A1* | 5/2023 | Zhang | H04L 5/0055 370/329 |

* cited by examiner

URLLC UCI MULTIPLEXING ENHANCEMENTS FOR INTRA-UE UPLINK CHANNEL COLLISIONS

CROSS REFERENCE

This Nonprovisional application claims priority under 35 U.S.C. § 119 on provisional Application No. 63/031,503 on May 28, 2020, the entire contents of which are hereby incorporated by reference.

TECHNICAL FIELD

The present disclosure generally relates to Channel State Information (CSI) reporting for ultra-reliable low latency-communication (URLLC) and, specifically, to enhancement of CSI reporting for URLLC such that a CSI report for URLLC can be differentiated from a CSI report for enhanced Mobile Broad-Band (eMBB) such that the CSI report for URLLC can be multiplexed when it collides with a high priority channel such as a Hybrid Automatic Repeat Request-Acknowledgement (HARQ-ACK) with or without a scheduling request (SR).

BACKGROUND ART

The CSI report configuration is a large part of the CSI report framework in the next generation wireless communication networks (e.g., fifth generation (5G) new radio (NR) networks). A URLLC service may require more frequent, more timely and more accurate CSI feedback as compared to an eMBB service.

In the current 3rd Generation Partnership Project (3GPP) specification, physical uplink control channels (PUCCHs) for periodic/semi-persistent CSI can be configured with PUCCH format 2, 3, or 4. With support of different service types, the PUCCH for periodic/semi-persistent CSI may be configured separately for ultra-reliable low latency-communication (URLLC) with different periodicities and error probability criteria. However, the current 3GPP specification does not provide enhancement on CSI report for high priority service types, such as URLLC services. That is, the CSI report for URLLC service type is configured with the same method as the CSI report for eMBB service types. For intra-UE collision handling at the Physical (PHY) layer, in a case where a high-priority uplink (UL) transmission overlaps with a low-priority UL transmission, the UE may drop the low-priority UL transmission under certain constraints (e.g., particular timelines).

Therefore, there is a need in the art to investigate methods for differentiating CSI reports for different service types (e.g., different priorities) to enhance the channel collision behaviors. in the next generation (e.g., fifth generation (5G) new radio (NR)) wireless communication networks.

SUMMARY OF INVENTION

In one example, a method by a user equipment (UE), the method comprising: configuring a Channel State Information (CSI) report for a first service type, the CSI report for the first service type being an ultra-reliable and low latency (URLLC) CSI report with a high priority; configuring a plurality of sets of second PUCCH resources for Hybrid Automatic Repeat Request-Acknowledgement (HARQ-ACK) for a second service type; determining a first physical uplink control channel (PUCCH) resource for the CSI report; determining a second PUCCH resource from the plurality of sets of second PUCCH resources for a HARQ-ACK feedback based on a priority and a payload size of the HARQ-ACK, the HARQ-ACK feedback being with or without scheduling request (SR) (HARQ-ACK with or without SR); determining the first PUCCH resource for the CSI report overlaps the second PUCCH resource for the HARQ-ACK feedback; performing one of a plurality of collision handling procedures based on the priority of the HARQ-ACK and the priority of CSI report.

In one example, a user equipment (UE) comprising: one or more non-transitory computer-readable media having computer-executable instructions embodied thereon; at least one processor coupled to the one or more non-transitory computer-readable media and configured to execute the computer-executable instructions to: configure a Channel State Information (CSI) report for a first service type, the CSI report for the first service type being an ultra-reliable and low latency (URLLC) CSI report with a high priority; configure a plurality of sets of second PUCCH resources for Hybrid Automatic Repeat Request-Acknowledgement (HARQ-ACK) for a second service type; determine a first physical uplink control channel (PUCCH) resource for the CSI report; determine a second PUCCH resource from the plurality of sets of second PUCCH resources for a HARQ-ACK feedback based on a priority and a payload size of the HARQ-ACK, the HARQ-ACK feedback being with or without scheduling request (SR) (HARQ-ACK with or without SR); determine the first PUCCH resource for the CSI report overlaps the second PUCCH resource for the HARQ-ACK feedback; perform one of a plurality of collision handling procedures based on the priority of the HARQ-ACK and the priority of CSI report.

BRIEF DESCRIPTION OF DRAWINGS

Implementations of the present technology will now be described, by way of example only, with reference to the attached figures.

DESCRIPTION OF EMBODIMENTS

Figure 1:
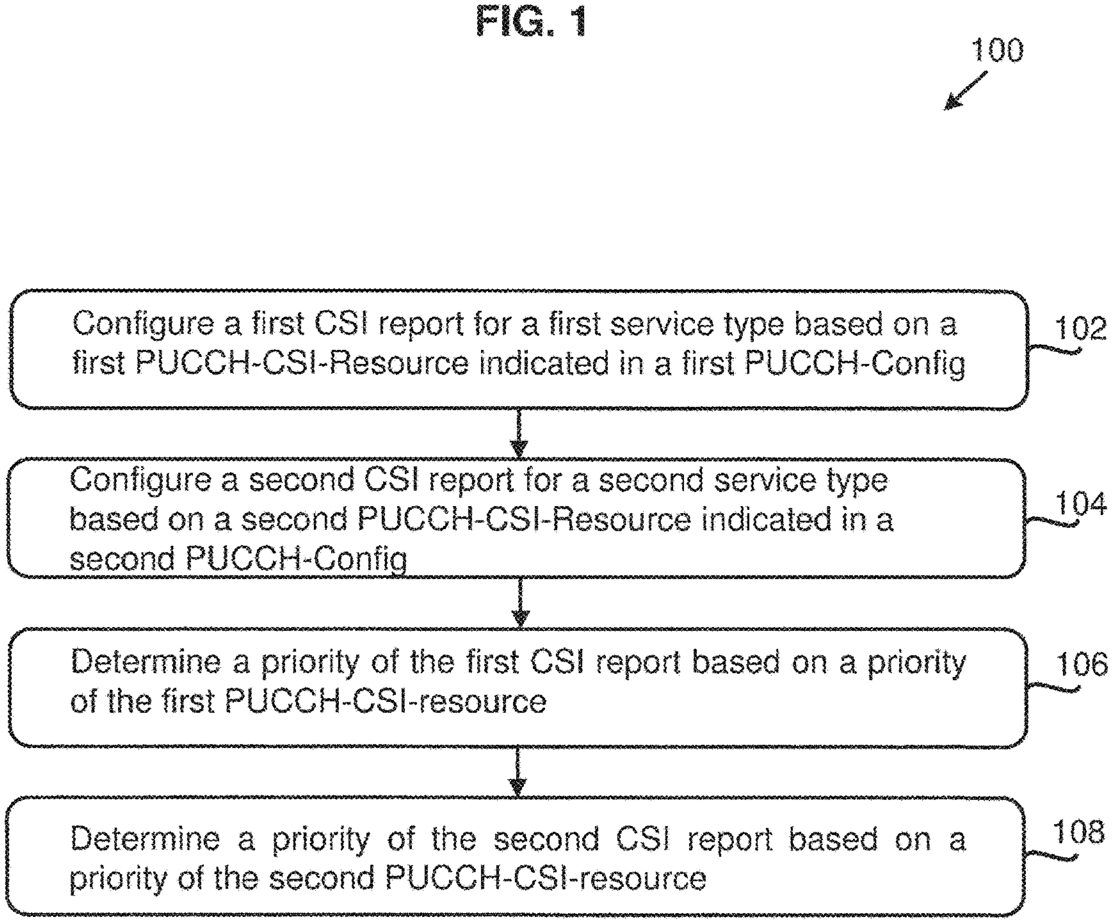
FIG. 1 illustrates a method for providing a CSI report for a first service type and a second service type when separate configurations are provided for the first service type and second service type according to an implementation of the present disclosure.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc.

In the 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed New Radio (NR) technologies by 3GPP, envision the use of time/frequency/space resources to allow for services, such as eMBB transmission, URLLC transmission, and massive Machine Type Communication (mMTC) transmission. Also, in NR, single-beam and/or multi-beam operations is considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

In the present disclosure, CSI report priority may be determined based on periodicity in the number of symbols or time duration. At least two levels of CSI report priority may be defined, for example, high priority and low priority.

In the present disclosure, reliability requirements (e.g., BLER requirements) may be different for different CSI reports for a particular service type.

In the present disclosure, different handling for different periodic/semi-persistent CSI for different service types (e.g., different timing and BLER requirements) and CSI report priorities are described.

In the next generation (e.g., 5G NR) wireless communication networks, different service types are supported, (e.g., eMBB and URLLC). In the present disclosure, at least two HARQ-ACK codebooks may be simultaneously constructed for different service types.

For example, Radio Network Temporary Identifier (RNTI) and/or downlink control information (DCI) in downlink (DL) assignment may be used for identifying PDSCHs for different service types (e.g., an eMBB PDSCH and a URLLC PDSCH). In another example, RNTI and/or DCI in DL assignment may be used for identifying HARQ-ACK codebooks for different service types (e.g., a slot level or a slot-based HARQ-ACK codebook for an eMBB PDSCH, a subslot level or sub-slot-based HARQ-ACK codebook for a URLLC service type, etc.).

In the present disclosure, prioritization (e.g., lower priority and higher priority) is supported for PUSCH transmission for different service types. For example, RNTI and/or DCI in UL grant may be used for identifying PUSCHs for different service types (e.g., an eMBB PUSCH and a URLLC PUSCH).

With different service types, separate period/semi-persistent CSI report for URLLC may be supported. Especially, for URLLC, the MCS setting can have different BLER targets, thus, the feedback of CSI may also be different based on different BLER targets. Thus, the periodicity for URLLC CSI report may be shorter than that of eMBB service type, and the PUCCH for the CSI feedback may also require ultra-reliability. Furthermore, NR supports that the SR priority is known at PHY layer.

In Rel-15, there is no priority differentiation for either periodic/semi-persistent CSI or SR.

Currently in NR, the PUCCH resource for periodic/semi-persistent CSI are configured with a periodicity in a number of slots. There has not been consideration for separate CSI report configurations for different service types.

In the present disclosure, enhancements to PUCCH configuration for periodic/semi-persistent CSI reporting are provided. In NR, different service types, such as eMBB and URLLC, are supported. To support different service types (e.g., URLLC), the PUCCH configuration for periodic/semi-persistent CSI may be enhanced with shorter periodicity and/or higher reliability requirements.

The BLER requirement for a periodic/semi-persistent CSI PUCCH resource for URLLC traffic may still be the same as existing CSI reports for eMBB (e.g., 10^-2). However, the BLER requirement for a periodic/semi-persistent CSI PUCCH resource for URLLC traffic may be enhanced with a much lower target (e.g., 10^-4 or 10^-5). This provides more reliable feedback with the tradeoff or higher PUCCH channel overhead.

If the PUCCH for periodicity for periodic/semi-persistent CSI of URLLC traffic is configured at subslot level, or with a much lower BLER requirement, the PUCCH for periodicity for periodic/semi-persistent CSI of URLLC service type may be configured separately from the PUCCH for periodicity for periodic/semi-persistent CSI of eMBB service type.

A PUCCH for periodic/semi-persistent CSI with normal BLER requirements may be configured for different service types (e.g., eMBB and URLLC). For eMBB service type traffic, the existing periodic/semi-persistent CSI report and PUCCH configurations may be sufficient. For URLLC service type traffic, the periodic/semi-persistent CSI report may be configured with shorter periodicity with normal BLER requirements. Since the CSI is reported more often for URLLC, the reliability requirements may be relaxed.

With the support of different service types, the PUCCH for a periodic/semi-persistent CSI report for a service type such as URLLC may be configured separately from the PUCCH for a periodic/semi-persistent CSI report for another service type, such as eMBB. The CSI report for URLLC may also require ultra-reliability (e.g., with a BLER target of 10^-5 or less).

CSI reports for URLLC can be configured with a subslot structure with periodicity determined based on a number of subslots instead of a number of slots. Furthermore, CSI reports for URLLC may be configured with higher reliability than CSI reports for eMBB. Several methods are provided.

Uplink control information (UCI) types reported in a PUCCH include HARQ-ACK information, scheduling request (SR), and CSI. UCI bits include any HARQ-ACK information bits, any SR information bits, any LRR information bit, and any CSI bits. The HARQ-ACK information bits correspond to a HARQ-ACK codebook.

In NR Release-16, two levels of priorities can be indicated for different services for HARQ-ACK reporting. For example, a higher priority indicated as a priority index 1 may be provided for URLLC services and a lower priority indicated as a priority index 0 may be provided for eMBB services.

A PUSCH or a PUCCH including any repetitions may be indicated as priority index 0 or priority index 1. If a priority index is not provided for a PUSCH or a PUCCH, the priority index is considered 0. For HARQ-ACK reporting, two HARQ-ACK codebooks can be constructed simultaneously for different service types.

In NR, a CSI report may include CQI (Channel Quality Information), a PMI (Precoding Matrix Indicator), a CRI (CSI-RS Resource Indicator), a SSBRI (SS/PBCH Resource Block Indicator), a LI (Layer Indicator), a RI (Rank Indicator) an/or an L1-RSRP (Layer 1-Reference Signal Received Power). In the current 3GPP specification, the CSI report is not enhanced for the URLLC service type. Therefore, the CSI for URLLC traffic and CSI for eMBB service are treated the same. The periodic/semi-persistent CSI reports for different service types are all configured with a periodicity at slot level.

Implementations of the present disclosure provide several methods for enhancing CSI report configurations in order to provide more timely and accurate CSI feedback for URLLC services. One enhancement is to increase granularity of a URLLC CSI report to allow short periodicity according to a number of subslots instead of a number of lots. Another enhancement is to better protect a URLLC CSI report with higher reliability to provide more accurate reports with periodicity and reliability enhanced independently or jointly for a CSI report for URLLC services.

A URLLC CSI report can be configured with a higher priority than an eMBB CSI report in order to differentiate the URLLC CSI report from eMBB CSI report. In a case where a URLLC CSI report collides with an eMBB CSI report in a slot or subslot, only the URLLC CSI is reported.

The CSI report configuration IE (Information Element) is illustrated in Table 1. The IE CSI-ReportConfig is used to configure a periodic or semi-persistent report sent via a PUCCH of the cell in which the CSI-ReportConfig is included or to configure a semipersistent or aperiodic report sent on a PUSCH triggered by DCI received by the cell in which the CSI-ReportConfig is included. The cell via which the report is sent is determined by the received DCI. See TS 38.214 [19], clause 5.2.1

TABLE 1

CSI-ReportConfig IE

```
-- ASN1START
-- TAG-CSI-REPORTCONFIG-START
CSI-ReportConfig ::=                SEQUENCE {
    reportConfigId                    CSI-ReportConfigId,
    carrier                         ServCellIndex    OPTIONAL,   -- Need S
    resourcesForChannelMeasurement              CSI-ResourceConfigId,
    csi-IM-ResourcesForInterference            CSI-ResourceConfigId  OPTIONAL, -- Need R
    nzp-CSI-RS-ResourcesForInterference CSI-ResourceConfigId  OPTIONAL, --
Need R
    reportConfigType                      CHOICE {
        periodic                        SEQUENCE {
            reportSlotConfig                    CSI-ReportPeriodicityAndOffset,
            pucch-CSI-ResourceList                  SEQUENCE (SIZE (1..maxNrofBWPs)) OF
PUCCH-CSI-Resource
        },
        semiPersistentOnPUCCH                     SEQUENCE {
            reportSlotConfig                      CSI-ReportPeriodicityAndOffset,
            pucch-CSI-ResourceList                  SEQUENCE (SIZE (1..maxNrofBWPs)) OF
PUCCH-CSI-Resource
        },
        semiPersistentOnPUSCH                     SEQUENCE {
            reportSlotConfig                  ENUMERATED {sl5, sl10, sl20, sl40, sl80, sl160,
sl320},
            reportSlotOffsetList SEQUENCE (SIZE (1..maxNrofUL-Allocations)) OF
INTEGER(0..32),
            p0alpha                         P0-PUSCH-AlphaSetId
        },
        aperiodic                       SEQUENCE {
            reportSlotOffsetList SEQUENCE (SIZE (1..maxNrofUL-Allocations)) OF
 INTEGER(0..32)
        }
    },
    reportQuantity                      CHOICE {
        none                            NULL,
        cri-RI-PMI-CQI                      NULL,
        cri-RI-i1                         NULL,
        cri-RI-i1-CQI                       SEQUENCE {
            pdsch-BundleSizeForCSI                    ENUMERATED {n2, n4}
 OPTIONAL   -- Need S
        },
        cri-RI-CQI                        NULL,
        cri-RSRP                          NULL,
        ssb-Index-RSRP                        NULL,
        cri-RI-LI-PMI-CQI                     NULL
    },
    reportFreqConfiguration                   SEQUENCE {
        cqi-FormatIndicator                     ENUMERATED { widebandCQI, subbandCQI }
 OPTIONAL,   -- Need R
        pmi-FormatIndicator                   ENUMERATED { widebandPMI, subbandPMI }
 OPTIONAL,   -- Need R
        csi-ReportingBand                       CHOICE {
            subbands3                           BIT STRING(SIZE(3)),
            subbands4                           BIT STRING(SIZE(4)),
            subbands5                           BIT STRING(SIZE(5)),
            subbands6                           BIT STRING(SIZE(6)),
            subbands7                           BIT STRING(SIZE(7)),
            subbands8                           BIT STRING(SIZE(8)),
            subbands9                           BIT STRING(SIZE(9)),
            subbands10                          BIT STRING(SIZE(10)),
            subbands11                          BIT STRING(SIZE(11)),
            subbands12                          BIT STRING(SIZE(12)),
            subbands13                          BIT STRING(SIZE(13)),
            subbands14                          BIT STRING(SIZE(14)),
            subbands15                          BIT STRING(SIZE(15)),
            subbands16                          BIT STRING(SIZE(16)),
            subbands17                          BIT STRING(SIZE(17)),
            subbands18                          BIT STRING(SIZE(18)),
            ...,
            subbands19-v1530                        BIT STRING(SIZE(19))
        }   OPTIONAL   -- Need S
    }                                         OPTIONAL,   -- Need R
    timeRestrictionForChannelMeasurements                ENUMERATED {configured,
 notConfigured},
    timeRestrictionForInterferenceMeasurements ENUMERATED {configured,
 notConfigured},
    codebookConfig                              CodebookConfig
 OPTIONAL,   -- Need R
    dummy                                     ENUMERATED {n1, n2}
```

TABLE 1-continued

CSI-ReportConfig IE

```
OPTIONAL,   -- Need R
    groupBasedBeamReporting                          CHOICE {
        enabled                                  NULL,
        disabled                                  SEQUENCE {
            nrofReportedRS                           ENUMERATED {n1, n2, n3, n4}
OPTIONAL   -- Need S
        }
    },
    cqi-Table                     ENUMERATED {table1, table2, table3, spare1}
OPTIONAL,   -- Need R
    subbandSize                   ENUMERATED {value1, value2},
    non-PMI-PortIndication SEQUENCE (SIZE ..maxNrofNZP-CSI-RS-
ResourcesPerConfig)) OF PortIndexFor8Ranks OPTIONAL, -- Need R
    ...,
    [[
    semiPersistentOnPUSCH-v1530                      SEQUENCE {
        reportSlotConfig-v1530                ENUMERATED {sl4, sl8, sl16}
    }                                                  OPTIONAL   -- Need R
    ]]
}
CSI-ReportPeriodicityAndOffset ::= CHOICE {
    slots4                       INTEGER(0..3),
    slots5                       INTEGER(0..4),
    slots8                       INTEGER(0..7),
    slots10                      INTEGER(0..9),
    slots16                      INTEGER(0..15),
    slots20                      INTEGER(0..19),
    slots40                      INTEGER(0..39),
    slots80                      INTEGER(0..79),
    slots160                     INTEGER(0..159),
    slots320                      INTEGER(0..319)
}
PUCCH-CSI-Resource ::=                   SEQUENCE {
    uplinkBandwidthPartId                 BWP-Id,
    pucch-Resource                      PUCCH-ResourceId
}
```

As shown in Table 1, PUCCH-CSI-Resources must be configured for the CSI-ReportConfig for periodic CSI and semi-persistent CSI on a PUCCH. A pucch-Resource is a PUCCH resource for the associated uplink BWP. Only PUCCH-Resource for format 2, 3 and 4 is supported for CSI reports. The actual PUCCH-Resource is configured in PUCCH-Config and indicated by its ID.

In the current 3GPP specification, the PUCCH for CSI reports is a low priority channel. Therefore, the PUCCH-CSI-Resources are configured with low priority PUCCH resources. The low priority PUCCH resources are for eMBB and are configured at slot level.

A PUSCH or a PUCCH including any repetitions can have low priority (index 0) or high priority (index 1). The priority index is considered 0 for a PUSCH or a PUCCH if a priority index is not provided. To support different service types of services, such as eMBB and URLLC, two HARQ-ACK codebooks can be constructed simultaneously.

In according to a first method of the present disclosure, when different PUCCH configurations (PUCCH-Configs) and PUCCH CSI resources (PUCCH-CSI-Resources) are configured for different service types, the CSI priority can be determined by the PUCCH resource configured for the CSI report. The CSI for URLLC can be configured with the PUCCH-Config for high priority with a subslot structure and high reliability (e.g., maximum coding rates, power control parameters, etc.). Also, a PUCCH-ResourceId may be configured independently in each PUCCH-Config, extra parameter may be added to determine which PUCCH-Config is associated with the PUCCH ResourceId.

According to the first method, a PUCCH for high priority can be configured with a finer granularity than the PUCCH for low priority with the low priority PUCCH configured at slot level and the high priority PUCCH configured at subslot level. The low priority PUCCH can be configured with a longer subslot size, such as a 7-symbol subslot, and the high priority PUCCH can be configured with a shorter subslot size, such as a 2-symbol subslot. If a UE is provided with subslotLength-ForPUCCH, a slot for an associated PUCCH transmission for a given PUCCH-Config includes a number of symbols indicated by subslotLength-ForPUCCH.

Furthermore, the high priority PUCCH can be configured with ultra-reliability by configuration of a much lower maximum coding rate and higher transmit power in power control parameters. The BLER for high priority PUCCH may be targeted at 10^-5 or 10^-6, instead of 10^-1 or 10^-2 for low priority PUCCH such that different PUCCH-Configs can be configured for a UE and the PUCCH priority should be indicated explicitly by RRC signaling.

To support different service types, a CSI report can also be configured separately from an eMBB CSI report. A CSI report for a URLLC service may be configured with a different PUCCH configuration (PUCCH-Config) from a CSI report for an eMBB service. The priority of the CSI report may be determined by the priority of a PUCCH CSI Resource indicated in the PUCCH-Config.

A separate PUCCH-Config may be configured for high priority traffic, such as for an URLLC, while the a PUCCH-Config for eMBB services may be configured for low priority and the CSI reports can also be configured with PUCCH resources based on different PUCCH-Configs for URLLC CSI and eMBB CSI. The priority of the CSI report is then determined by the priority of the PUCCH resource provided by the corresponding PUCCH-Config. If a UE is provided subslotLength-ForPUCCH in a PUCCH-Config, the slot for CSI-ReportPeriodicityAndOffset refers to a slot for an associated PUCCH transmission that includes a number of symbols indicated by subslotLength-ForPUCCH. A CSI report for URLLC may be configured with a PUCCH resource with a PUCCH-Config indicating high priority and an indication of PUCCH reliability can be provided in the PUCCH-Config as well.

If the PUCCH-ResourceId is unique for each PUCCH resource in all PUCCH-Configs, the PUCCH-ResourceIds for different PUCCH-Configs are different. Therefore, the PUCCH-ResourceId itself is sufficient to determine the slot/subslot duration and PUCCH priority.

However, if the PUCCH-ResourceId can be configured separately for each PUCCH-Config, the same PUCCH-ResourceId may be used under different PUCCH-Config. Therefore, the PUCCH-ResourceIds is not sufficient to determine the PUCCH resource and the PUCCH priority and the corresponding PUCCH-Config for the PUCCH-ResourceId should also be indicated, such as a PUCCH-ConfigId.

FIG. 1 illustrates a method 100 for providing a CSI report for a first service type and a second service type when separate configurations are provided for the first service type and second service type according to an implementation of the present disclosure. The first service type may be for URLLC and the second service type may be for eMBB.

As illustrated in FIG. 1, action 102 includes configuring a first CSI report for a first service type based on a first PUCCH-CSI-Resource indicated in a first PUCCH-Config. In one implementation, the first service type may be for an eMBB service type.

Action 104 includes configuring a second CSI report for a second service type based on a second PUCCH-CSI-Resource indicated in a second PUCCH-Config. In one implementation, the second service type may be for a URLLC service type.

In the present implementation, two separate PUCCH-Configs are configured, one for high priority traffic (e.g., URLLC), the other one for a low priority traffic (e.g., eMBB). Two CSI reports are also configured with different PUCCH resources based on the PUCCH-Config for the URLLC CSI and the PUCCH-Config for the eMBB CSI.

Action 106 includes determining a priority of the first CSI report based on a priority of the first PUCCH-CSI-resource. Action 108 includes determining a priority of the second CSI report based on a priority of the second PUCCH-CSI-resource. In actions 106 and 108, the priority of each of the first and second CSI reports is determined by the priority of each of the respective first and second PUCCH-CSI-Resources, which are indicated in the respective first and second PUCCH-Configs.

In one implementation, the second PUCCH-CSI-Resource may be configured with a finer granularity than the first PUCCH-CSI-Resource with second PUCCH-CSI-Resource indicating a higher priority than the first PUCCH-CSI-Resource. In one example, the second PUCCH-CSI-Resource may be configured with a subslot level granularity with the first PUCCH-CSI-Resource configured with a slot level granularity. The finer granularity in the second PUCCH-CSI-Resource indicates that the second CSI report has a higher priority than the first CSI report.

In another example, the first PUCCH-CSI-Resource may be configured with a first subslot level granularity and the second PUCCH-CSI-Resource configured with a second subslot level granularity where the first subslot level granularity has a longer subslot size than the second subslot level granularity. That is, the first subslot level granularity has a longer subslot size than the second subslot level granularity, thereby indicating the second CSI report has a higher priority than the first CSI report.

In yet another example, the first PUCCH-Config may include a first subslotLength-ForPUCCH that indicates a first number of symbols within a slot for an associated first PUCCH transmission, and the second PUCCH-Config may include a second subslotLength-ForPUCCH that indicates a second number of symbols within a slot for an associated second PUCCH transmission, where the first number of symbols is greater than the second number of symbols. The lesser number of symbols within a slot for the associated second PUCCH transmission indicates that the second CSI report associated with the second subslotLength-ForPUCCH has a higher priority than the first CSI report.

In one implementation, when different configurations and resources are provided for each of the first service type and the second service type, CSI report priority for the first service type is determined by a first resource, such as a first PUCCH resource configuration, and CSI report priority for the second service type is determined by a second resource, such as a second PUCCH resource configuration. There is no need for any specific indication of the priority for each of the first service type and the second service type because the different configurations and resources provided for each of the first service type and the second service type are sufficient to also indicate priority.

In another implementation, when different configurations are provided for each of the first service type and the second service type with resources independently configured for each of the first service type and the second service type, CSI report priority for the first service type is determined by a first identifier, such as a first PUCCH-ResourceId, in the first resource (i.e. first PUCCH resource configuration) and CSI report priority for the second service type is determined by a second identifier, such as a second PUCCH-ResourceId, in the a second resource (i.e. second PUCCH resource configuration). The specific identifiers are necessary because the independently configured resources for each of the first service type and the second service type allow for resources for the first service type and the second service type to be the same as well as any corresponding priority.

In addition to indicating CSI report priority by configured granularity of the associated PUCCH-CSI-Resources, a high CSI report priority may be indicated by a high priority PUCCH configured with ultra-reliability.

In one implementation, when the second PUCCH-CSI-Resource is configured with at least one of a lower maximum coding rate and a higher transmit power, the second PUCCH-CSI-Resource has a higher reliability than the first PUCCH-CSI-Resource. In one example, the second PUCCH-CSI-Resource may be configured with a BLER for the second CSI report in a range of 10^-5 and 10^-6, and the first PUCCH-CSI-Resource configured with a BLER for the first CSI report in a range of 10^-1 and 10^-2. The higher BLER associated with the second PUCCH-CSI-Resource may indicate that the second CSI report has a higher priority than the first CSI report. In another example, the second PUCCH transmission for transmitting the second PUCCH-CSI-Resource may be configured with a higher transmit power than the first PUCCH transmission for transmitting the first PUCCH-CSI-Resource. The higher transmit power associated with the second PUCCH transmission may indicate that the second CSI report has a higher priority than the first CSI report.

In one implementation, the first PUCCH-CSI-Resource in the first PUCCH-Config may be configured with a first PUCCH-Resource Identifier (PUCCH-ResourceId) and the second PUCCH-CSI-Resource in the second PUCCH-Config may be configured with a second PUCCH-ResourceId. For example, when the first PUCCH-ResourceId is different from the second PUCCH-ResourceId, a first CSI report configuration indicates the first PUCCH-CSI-Resource according to the first PUCCH-ResourceId and a second CSI report configuration indicates the second PUCCH-CSI-Resource according to the second PUCCH-ResourceId.

As shown in Table 2 below, each PUCCH-CSI-Resource may include a "PUCCH-ResourceId", which by itself is sufficient to determine the slot/subslot duration and PUCCH priority.

TABLE 2

| PUCCH-CSI-Resource Content | |
|---|---|
| PUCCH-CSI-Resource ::= | SEQUENCE { |
| uplinkBandwidthPartId | BWP-Id, |
| pucch-Resource | PUCCH-ResourceId |
| } | |

In another example, the first PUCCH-ResourceId may be the same as the second PUCCH-ResourceId. The same PUCCH-ResourceId may be used under different PUCCH-Configs. In other words, the PUCCH-ResourceId alone may not be sufficient to identify or determine a PUCCH-CSI-Resource and PUCCH priority. In such a case, a PUCCH-CongfigId in addition to the PUCCH-ResourceId may be used to identify or determine a PUCCH-CSI-Resource and PUCCH priority. For example, a first CSI report configuration indicates the first PUCCH-CSI-Resource according to the first PUCCH-ResourceId and a first PUCCH-ConfigId, and a second CSI report configuration indicates the second PUCCH-CSI-Resource according to the second PUCCH-ResourceId and a second PUCCH-ConfigId.

As shown in Table 3 below, each PUCCH-CSI-Resource may include a "PUCCH-ResourceId" and a PUCCH-ResourceId, the combination of which is sufficient to determine the slot/subslot duration and PUCCH priority.

TABLE 3

| PUCCH-CSI-Resource Content | |
|---|---|
| PUCCH-CSI-Resource ::= | SEQUENCE { |
| uplinkBandwidthPartId | BWP-Id, |
| pucch-Config | PUCCH-ConfigId |
| pucch-Resource | PUCCH-ResourceId |
| } | |

In according to a second method of the present disclosure, when the same PUCCH-Config is used for CSI reports of different service types, or there is only one PUCCH-Config, the CSI reports can be explicitly indicated by higher layer signaling. A URLLC CSI report may be configured with high priority or low priority, and an eMBB CSI report may only be configured with low priority. The PUCCH reliability is the same for CSI with different priorities.

For example, a CSI report for URLLC can be configured with a report priority via explicit higher layer signaling. If a single PUCCH-Config is configured for the UE or all CSI reports are configured with the same PUCCH-Config, an explicit indication via higher layer signaling may be used to indicate the CSI report priority. Therefore, the CSI report for an URLLC may be configured with high priority via explicit RRC signaling even if the CSI PUCCH resources are configured with the same granularity and priority. A new parameter can be added to the CSI report IE as illustrated in Table 4.

TABLE 4

| CSI Report IE Having a New reprotPriority Parameter | |
|---|---|
| ... | |
| periodic | SEQUENCE { |
| reportSlotConfig | CSI-ReportPeriodicityAndOffset, |
| reportPriority | ENUMERATED {0, 1} |
| pucch-CSI-ResourceList | SEQUENCE (SIZE (1..maxNrofBWPs)) OF |
| PUCCH-CSI-Resource | |
| }, | |
| semiPersistentOnPUCCH | SEQUENCE { |
| reportSlotConfig | CSI-ReportPeriodicityAndOffset, |
| reportPriority | ENUMERATED {0, 1} |
| pucch-CSI-ResourceList | SEQUENCE (SIZE (1..maxNrofBWPs)) OF |
| PUCCH-CSI-Resource | |
| }, | |
| ... | |

Priority is considered low priority with an index of 0 if the CSI report priority is not configured. The CSI report priority for an URLLC CSI may be configured with high priority or low priority while the CSI report priority for an eMBB CSI may only be configured with low priority.

The corresponding priorities of a first and a second service types are determined according to the explicit indication that is needed in view of the single configuration for the first service type and second service type that does not allow for indication of different priorities of the first and second service types. The reliability is the same for the CSI report for the first service type and the CSI report for the second service type even when different priorities are indicated by the explicit indication.

The explicit indication may be included in a CSI report information element (IE) and may include a CSI report priority index. The higher layer signaling may include radio resource control (RRC) signaling.

Figure 2:
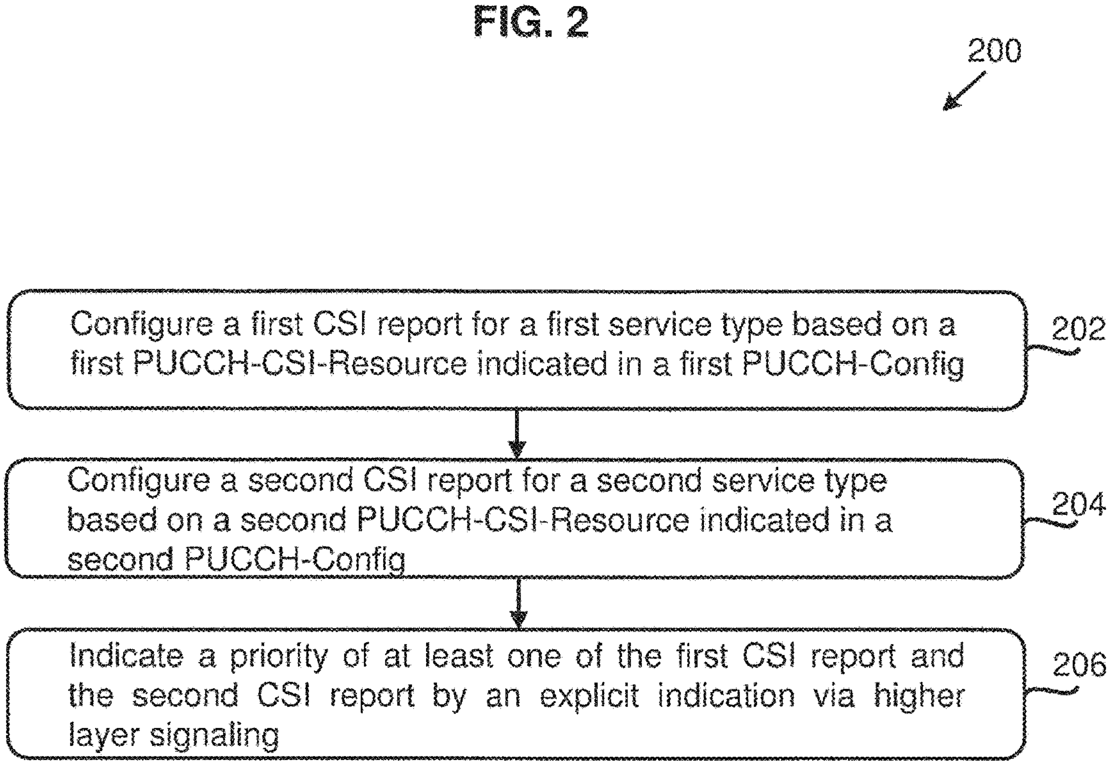
FIG. 2 illustrates a method for providing a CSI report for a first service type and a second service type when a single PUCCH-Config is provided for the first and second service type according to an implementation of the present disclosure.

FIG. 2 illustrates a method 200 for providing a CSI report for a first service type and a second service type when a single PUCCH-Config is provided for the first and second service type according to an implementation of the present disclosure. As shown in FIG. 2, action 202 includes configuring a first CSI report for a first service type with a first PUCCH-CSI-Resource indicated in a PUCCH-Config. Action 204 includes configuring a second CSI report for a second service type with a second PUCCH-CSI-Resource indicated in the same PUCCH-Config. Action 206 includes indicating a priority of at least one of the first CSI report and the second CSI report by using an explicit indication via higher layer signaling.

For example, the first service type may be for eMBB and the second service type may be for URLLC with a same configuration and different resources provided for each of the first and second service types. The CSI report priority for each service type may be indicated by using an explicit indication via higher layer signaling.

The first PUCCH-CSI-Resource and the second PUCCH-CSI-Resource may be configured with the same granularity. The first PUCCH-CSI-Resource and the second PUCCH-CSI-Resource may be configured with the same priority. The first PUCCH-CSI-Resource and the second PUCCH-CSI-Resource may be configured with at least one of a same slot or subslot level periodicity, a same maximum coding rate and a same power control parameter.

The CSI report priority can be different but the PUCCH resource for CSI reporting may use the same PUCCH parameters, such as the slot or subslot structure, maximum coding rate and power control parameters. As a result, the high priority URLLC CSI report is not protected with ultra-reliability.

In according to a third method of the present disclosure, a separate PUCCH-Config can be configured for PUCCH resources for URLLC CSI reports with desired periodicity (e.g., at slot/subslot level) and reliability (e.g., with maximum coding rates and power control parameters) requirements.

A URLLC CSI report may require finer granularity than an eMBB CSI report but not require any extra reliability enhancement for the PUCCH transmission. Therefore, a separate PUCCH-Config can be configured to provide the desired periodicity and reliability requirements for URLLC CSI reports.

The PUCCH parameters may be configured independently for periodicity at slot level or subslot level with reliability having desired coding rate and power control settings. The PUCCH for an URLLC CSI report may be configured with a slot/subslot structure, as in the PUCCH-Config for high priority, and a maximum coding rate and power control parameters, as in the PUCCH-Config for high priority.

Figure 3:
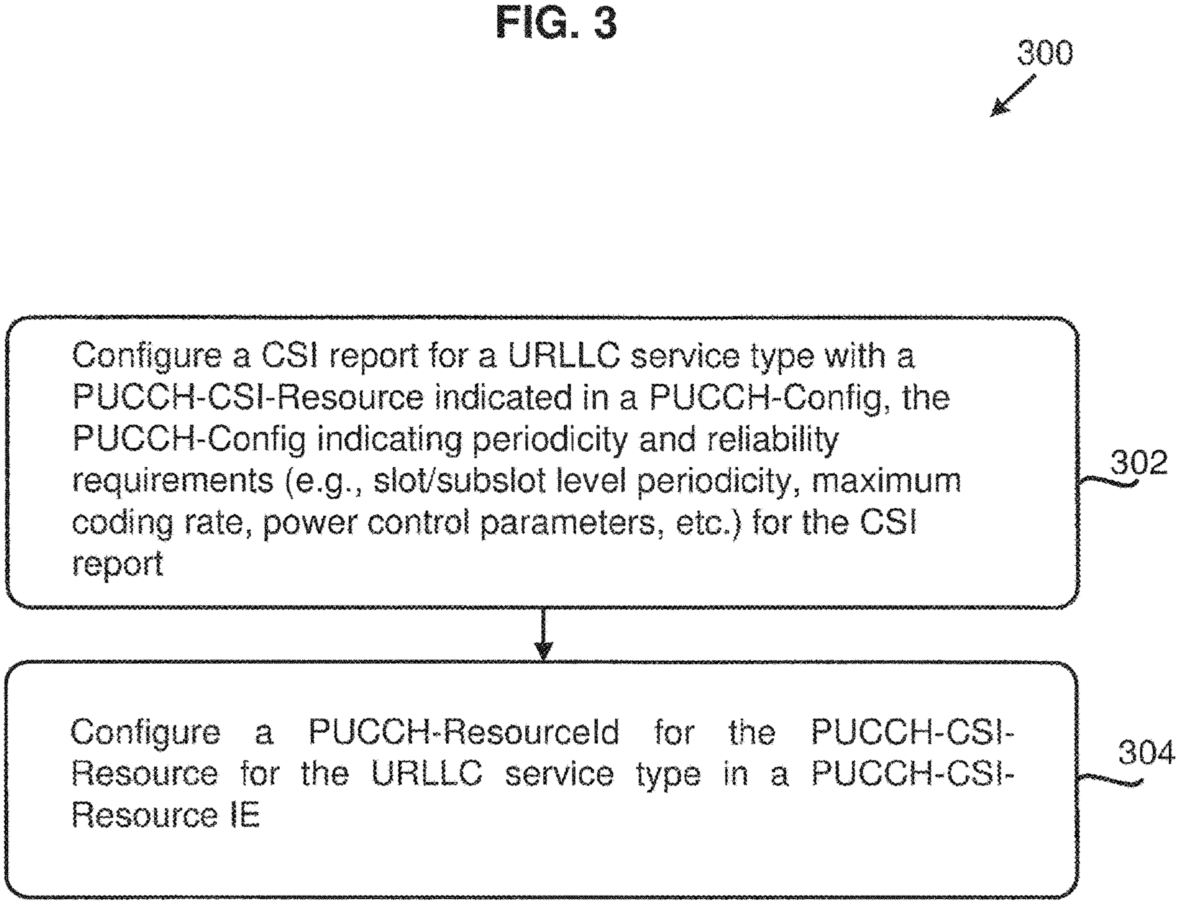
FIG. 3 illustrates a method for providing a CSI report for a URLLC service type with desired periodicity and reliability requirements according to an implementation of the present disclosure.

FIG. 3 illustrates a method 300 for providing a CSI report for a URLLC service type with desired periodicity and reliability requirements according to an implementation of the present disclosure. The first service type may be for URLLC and the second service type may be for eMBB with a configuration for the first service type indicating periodicity at a slot or sub-slot level and reliability with maximum coding rates and power control.

As illustrated in FIG. 3, action 302 includes configuring a CSI report for a URLLC service type with a PUCCH-CSI-Resource indicated in a PUCCH-Config. The PUCCH-Config may indicate at least one of a slot or subslot level periodicity, a maximum coding rate, and one or more power control parameters for the CSI report. The PUCCH resources for URLLC CSI may then be configured based on the new PUCCH-Config.

Action 304 includes configuring a PUCCH-ResourceId for the PUCCH-CSI-Resource for the URLLC service type in a PUCCH-CSI-Resource IE.

The PUCCH-ConfigId of the new PUCCH-Config may be indicated in the PUCCH-CSI-Resource information element, as shown in Table 5 below.

TABLE 5

| PUCCH-CSI-Resource Content | |
|---|---|
| PUCCH-CSI-Resource ::= | SEQUENCE { |
| uplinkBandwidthPartId | BWP-Id, |
| pucch-Config | PUCCH-ConfigId |
| pucch-Resource | PUCCH-ResourceId |
| } | |

In the current 3GPP specification (Rel-16), the existing channel collision rules are as follows.

A PUSCH or a PUCCH, including repetitions if any, can be of priority index 0 or of priority index 1. If a priority index is not provided for a PUSCH or a PUCCH, the priority index is 0. If in an active DL BWP a UE monitors PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority. If, after resolving overlapping for PUCCH and/or PUSCH transmissions of a same priority index, a UE determines to transmit:
  - a first PUCCH of larger priority index, a PUSCH or a second PUCCH of smaller priority index, and a transmission of the first PUCCH would overlap in time with a transmission of the PUSCH or the second PUCCH, the UE does not transmit the PUSCH or the second PUCCH;
  - a PUSCH of larger priority index, a PUCCH of smaller priority index, and a transmission of the PUSCH would overlap in time with a transmission of the PUCCH, the UE does not transmit the PUCCH;
  - a first PUSCH of larger priority index on a serving cell, a second PUSCH of smaller priority index on the serving cell, and a transmission of the first PUSCH would overlap in time with a transmission of the second PUSCH, the UE does not transmit the second PUSCH, where at least one of the two PUSCH is not scheduled by a DCI format.

In the remaining of this Clause, a UE multiplexes UCIs with same priority index in a PUCCH or a PUSCH. A PUCCH or a PUSCH is assumed to have a same priority index as a priority index of UCIs a UE multiplexes in the PUCCH or the PUSCH.

In the remaining of this Clause, if a UE is provided subslotLength-ForPUCCH, a slot for an associated PUCCH transmission includes a number of symbols indicated by subslotLength-ForPUCCH.

A UE multiplexes HARQ-ACK information, with or without SR, and CSI report(s) in a same PUCCH if the UE is provided simultaneousHARQ-ACK-CSI; otherwise, the UE drops the CSI report(s) and includes only HARQ-ACK information, with or without SR, in the PUCCH. If the UE would transmit multiple PUCCHs in a slot that include HARQ-ACK information and CSI report(s), the UE expects to be provided a same configuration for simultaneousH-ARQ-ACK-CSI each of PUCCH formats 2, 3, and 4.

If a UE is provided only one PUCCH resource set for transmission of HARQ-ACK information in response to PDSCH reception scheduled by a DCI format or in response to a SPS PDSCH release, the UE does not expect to be provided simultaneousHARQ-ACK-CSI.

A UE is configured by maxCodeRate a code rate for multiplexing HARQ-ACK, SR, and CSI report(s) in a PUCCH transmission using PUCCH format 2, PUCCH format 3, or PUCCH format 4.

As can be seen above, in Rel-16, a CSI report is given a low priority regardless of whether the CSI is for URLLC channel feedback or eMBB channel feedback. In addition, since UCI multiplexing between different channel priorities is currently not supported, for PUCCH collision between URLLC HARQ-ACK with or without SR and URLLC CSI, the PUCCH for URLLC CSI will be dropped and the PUCCH carrying HARQ-ACK with or without SR for URLLC will be transmitted. The frequent dropping of URLLC CSI can cause inaccurate and delayed CSI feedback of the URLLC transmissions. Consequently, the inaccurate CSI can cause inappropriate MCS indication, degrade the performance, and reduce the effective throughput and spectrum efficiency of NR services.

With the existing channel collision rules, only UCIs of the same priority can be multiplexed on a single channel (e.g., a PUCCH or PUSCH). A CSI report is treated as having a low priority (i.e., a lower priority index, a priority index 0). Thus, for a PUCCH collision between a HARQ-ACK with or without SR and a CSI report, for a URLLC HARQ-ACK with or without SR collision with a CSI report, the CSI report is dropped, and the PUCCH for URLLC HARQ-ACK with or without SR is transmitted. Also, for a PUCCH collision between a HARQ-ACK with or without SR and a CSI report, for an eMBB HARQ-ACK with or without SR collision with a CSI report, the CSI report can be multiplexed with the HARQ-ACK if the UE is provided a simultaneous HARQ-ACK-CSI; otherwise, the CSI report is dropped, and only the HARQ-ACK is transmitted.

To provide more reliable and timely feedback for URLLC channel state, according to implementations of the present disclosure, CSI can be divided into URLLC CSI and eMBB CSI with different priorities. To enhance a CSI report for URLLC, the CSI report for URLLC may be differentiated from a CSI report for eMBB by giving a higher priority to the URLLC CSI report than the eMBB CSI report. The CSI reports for URLLC may be configured with a subslot structure, and the periodicity may be determined in a number of subslots instead of slots. Furthermore, the CSI reports for URLLC may be configured with higher reliability than the CSI reports for eMBB.

With the CSI differentiation, several enhancement methods are described below for UCI multiplexing when channel collision occurs involving a CSI report and a HARQ-ACK with or without SR, especially for channel collision between a URLLC HARQ-ACK with or without SR and a URLLC CSI.

Figure 4:
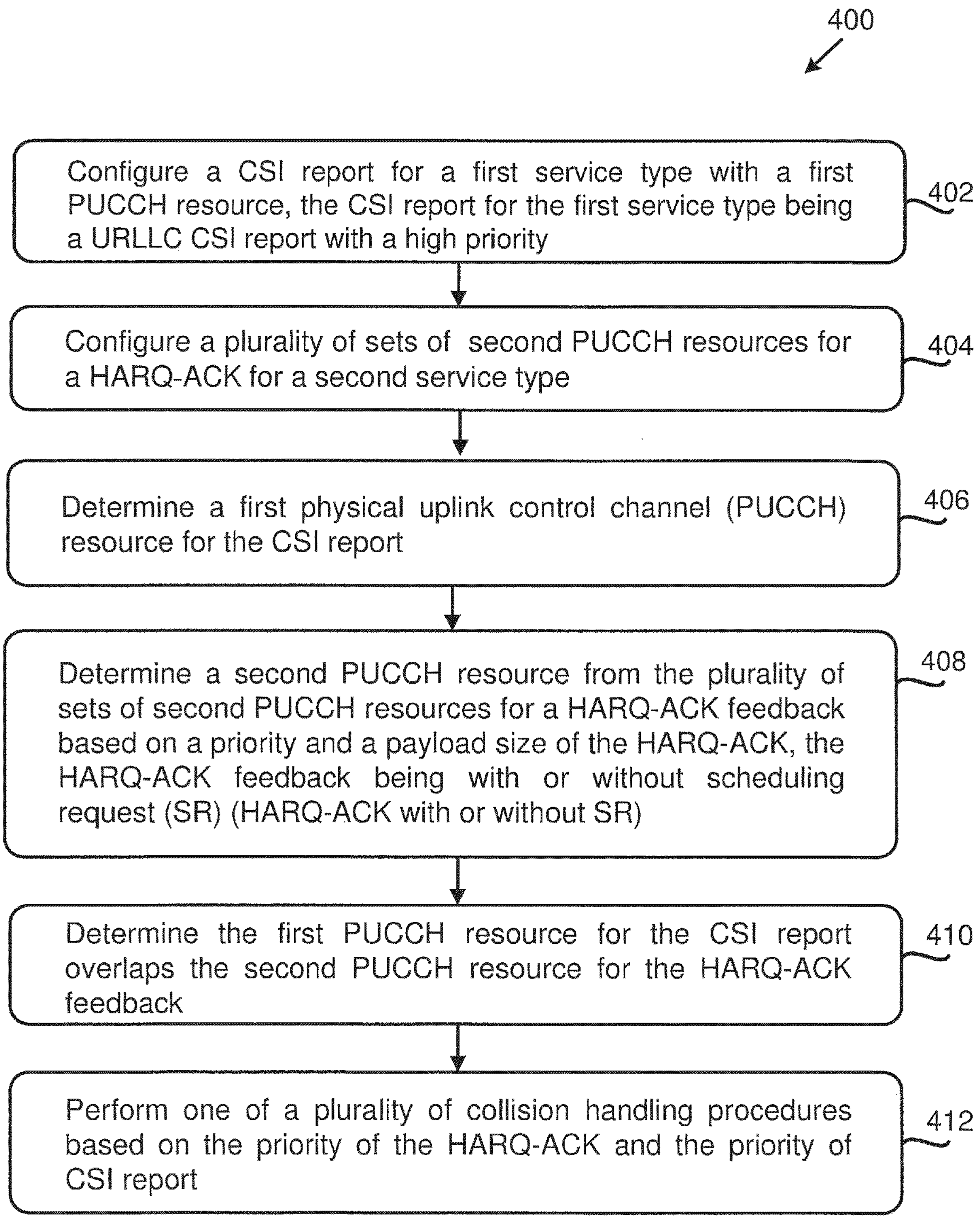
FIG. 4 illustrates a flowchart of a method for channel collision handling between HARQ-ACK with or without SR and a CSI report according to an implementation of the present disclosure.

FIG. 4 illustrates a flowchart of a method for channel collision handling between HARQ-ACK with or without SR and a CSI report according to an implementation of the present disclosure. In FIG. 4, the flowchart 400 includes actions 402, 404, 406, 408, 410 and 412. Action 402 may include configuring a CSI report for a first service type with a first PUCCH resource, the CSI report for the first service type being a URLLC CSI report with a high priority. Action 404 may include configuring a plurality of sets of second PUCCH resources for a HARQ-ACK for a second service type. Action 406 may include determining a first physical uplink control channel (PUCCH) resource for the CSI report. Action 408 may include determining a second PUCCH resource from the plurality of sets of second PUCCH resources for a HARQ-ACK feedback based on a priority and a payload size of the HARQ-ACK, the HARQ-ACK feedback being with or without scheduling request (SR) (HARQ-ACK with or without SR). Action 410 may include determining the first PUCCH resource for the CSI report overlaps the second PUCCH resource for the HARQ-ACK feedback. Action 412 may include performing one of a plurality of collision handling procedures based on the priority of the HARQ-ACK and the priority of CSI report.

In accordance to various collision handling procedures of the present disclosure, the CSI reports can be configured with different priorities. For example, an URLLC CSI may be configured with a high priority. As provided by the several methods for the CSI priority indication, the CSI report priority may be determined by the corresponding PUCCH-Config associated with the CSI report configuration, or by an explicit higher layer indication, or by a separate PUCCH-Config for URLLC CSI.

Figure 5:
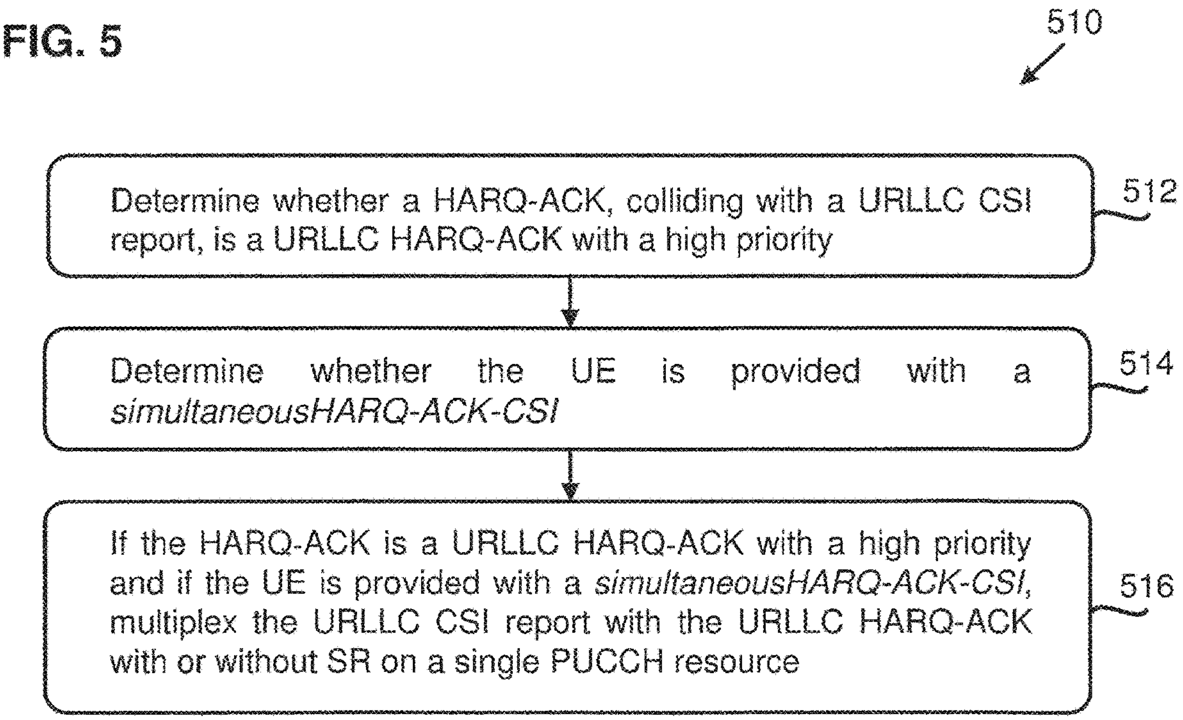
FIG. 5 illustrates a flowchart of a collision handling procedure for a channel collision between a PUCCH with a URLLC HARQ-ACK with or without SR and a PUCCH for a URLLC CSI, according to an implementation of the present disclosure.

FIG. 5 illustrates a flowchart of a collision handling procedure for a channel collision between a PUCCH with a URLLC HARQ-ACK with or without SR and a PUCCH for a URLLC CSI, according to an implementation of the present disclosure. In one implementation, the flowchart 510 may correspond to one of the plurality of collision handling procedures mentioned in action 410 in FIG. 4.

According to the collision handling procedure in the flowchart 510, the UE, in action 512, may determine whether a HARQ-ACK is a URLLC HARQ-ACK with or without SR that collides with a URLLC CSI report. In action 514, the UE may determine whether it is provided with a simultaneousHARQ-ACK-CSI. If the HARQ-ACK is a URLLC HARQ-ACK with a high priority and if the UE is provided with a simultaneousHARQ-ACK-CSI, then the UE, in action 516, may multiplex the URLLC CSI with the URLLC HARQ-ACK with or without SR on a single PUCCH resource. For example, the URLLC CSI may be multiplexed with the URLLC HARQ-ACK on a PUCCH resource from a plurality of sets of PUCCH resources configured for the URLLC HARQ-ACK. In some implementations, the channel collision rules of CSI and eMBB HARQ-ACK multiplexing on PUCCH may be applied to the UCI multiplexing on a PUCCH resource configured for URLLC HARQ-ACK.

In some implementations, if the CSI report priority is determined based on the PUCCH-Config associated with the CSI report configurations, a high priority CSI for URLLC may be configured with a PUCCH-Config with high priority or a new PUCCH-Config configured for URLLC CSI. In this case, the PUCCH for URLLC CSI with the high priority has the same priority index as the PUCCH for URLLC HARQ-ACK with or without SR. The current priority UCI multiplexing method between HARQ-ACK with or without SR and CSI may be applied.

In some implementations, the CSI report priority may be determined based on a higher layer (e.g., the PHY layer) signaling with an explicit higher layer indication in the PUCCH-Config associated with the CSI report configurations. If the explicit higher layer indication indicates a high priority CSI for URLLC, the URLLC CSI may be multiplexed with the URLLC HARQ-ACK with or without SR regardless of whether the PUCCH-Config associated with the CSI report is a low priority PUCCH configuration or a high priority PUCCH configuration.

In some implementations, the CSI report priority may be determined based on a separate PUCCH-Config for a URLLC CSI report. If the CSI report is configured with the new PUCCH-Config, the CSI report is treated as a high priority CSI for URLLC. The CSI report for URLLC may be multiplexed with the URLLC HARQ-ACK with or without SR even if the PUCCH-Config associated with the CSI report is a low priority PUCCH config.

For PUCCH collision between a URLLC HARQ-ACK with or without SR and a URLLC CSI, the UE may multiplex the HARQ-ACK with or without SR and the CSI report(s) in a same PUCCH, if the UE is provided simultaneousHARQ-ACK-CSI. Otherwise, the UE drops the CSI report(s) and includes only the HARQ-ACK with or without SR in the PUCCH. If the UE is configured to transmit multiple PUCCHs in a slot that includes HARQ-ACK information and CSI report(s), then the UE expects to be provided with a same configuration for simultaneousHARQ-ACK-CSI each of PUCCH formats 2, 3, and 4. If the UE is provided with only one PUCCH resource set for the transmission of HARQ-ACK information in response to a PDSCH reception scheduled by a DCI format or in response to a SPS PDSCH release, the UE does not expect to be provided with a simultaneousHARQ-ACK-CSI.

Figure 6:
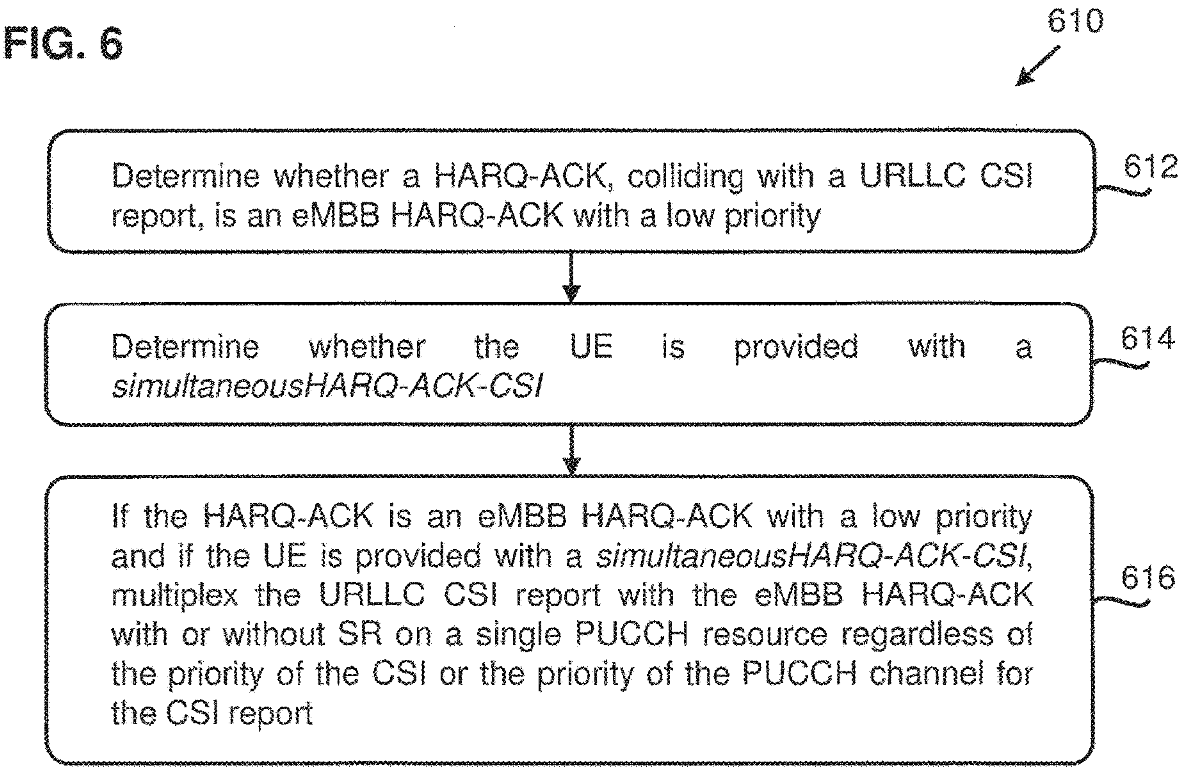
FIG. 6 illustrates a flowchart of a collision handling procedure for a channel collision between a PUCCH with URLLC CSI and a PUCCH for eMBB HARQ-ACK with or without SR, according to an implementation of the present disclosure.

FIG. 6 illustrates a flowchart of a collision handling procedure for a channel collision between a PUCCH with URLLC CSI and a PUCCH for eMBB HARQ-ACK with or without SR, according to an implementation of the present disclosure. In one implementation, the flowchart 610 may correspond to one of the plurality of collision handling procedures mentioned in action 410 in FIG. 4.

According to the collision handling procedure in the flowchart 610, the UE, in action 612, may determine whether a HARQ-ACK is an eMBB HARQ-ACK with or without SR that collides with a URLLC CSI report. In action 614, the UE may determine whether it is provided with a simultaneousHARQ-ACK-CSI. If the HARQ-ACK is an eMBB HARQ-ACK and if the UE is provided with a simultaneousHARQ-ACK-CSI, then the UE, in action 616, may multiplex the URLLC CSI with the eMBB HARQ-ACK with or without SR on a single PUCCH resource regardless of the priority of the CSI or the priority of the PUCCH channel for the CSI report.

In some implementations, in the case of a URLLC CSI report colliding with an eMBB HARQ-ACK with or without SR, the URLLC CSI may still be multiplexed with the eMBB HARQ-ACK on a single PUCCH resource similar to the collision handling rules in the current specification. This avoids the dropping of eMBB HARQ-ACK, which is more important than CSI based on UCI type.

In some implementations, the URLLC CSI report is configured with the same PUCCH-Config as the eMBB HARQ-ACK, or with a separate URLLC CSI PUCCH-Config without ultra-reliability. The multiplexing of the eMBB HARQ-ACK and the URLLC CSI report provides feedback of both the eMBB HARQ-ACK and the URLLC CSI report.

In some implementations, in a case where the CSI report priority is determined based on the PUCCH-Config associated with the CSI report configurations, a high priority CSI for URLLC may be configured with a PUCCH-Config with a high priority, or with a new PUCCH-Config configured for the URLLC CSI report. In this case, the joint reporting of the URLLC CSI and the eMBB HARQ-ACK can also provide the CSI report in a timely manner. With joint coding of the HARQ-ACK and CSI on a single PUCCH, the UCI may be validated by CRC checking. Thus, the UE may simply drop or ignore the CSI if the CRC check fails.

Figure 7A:
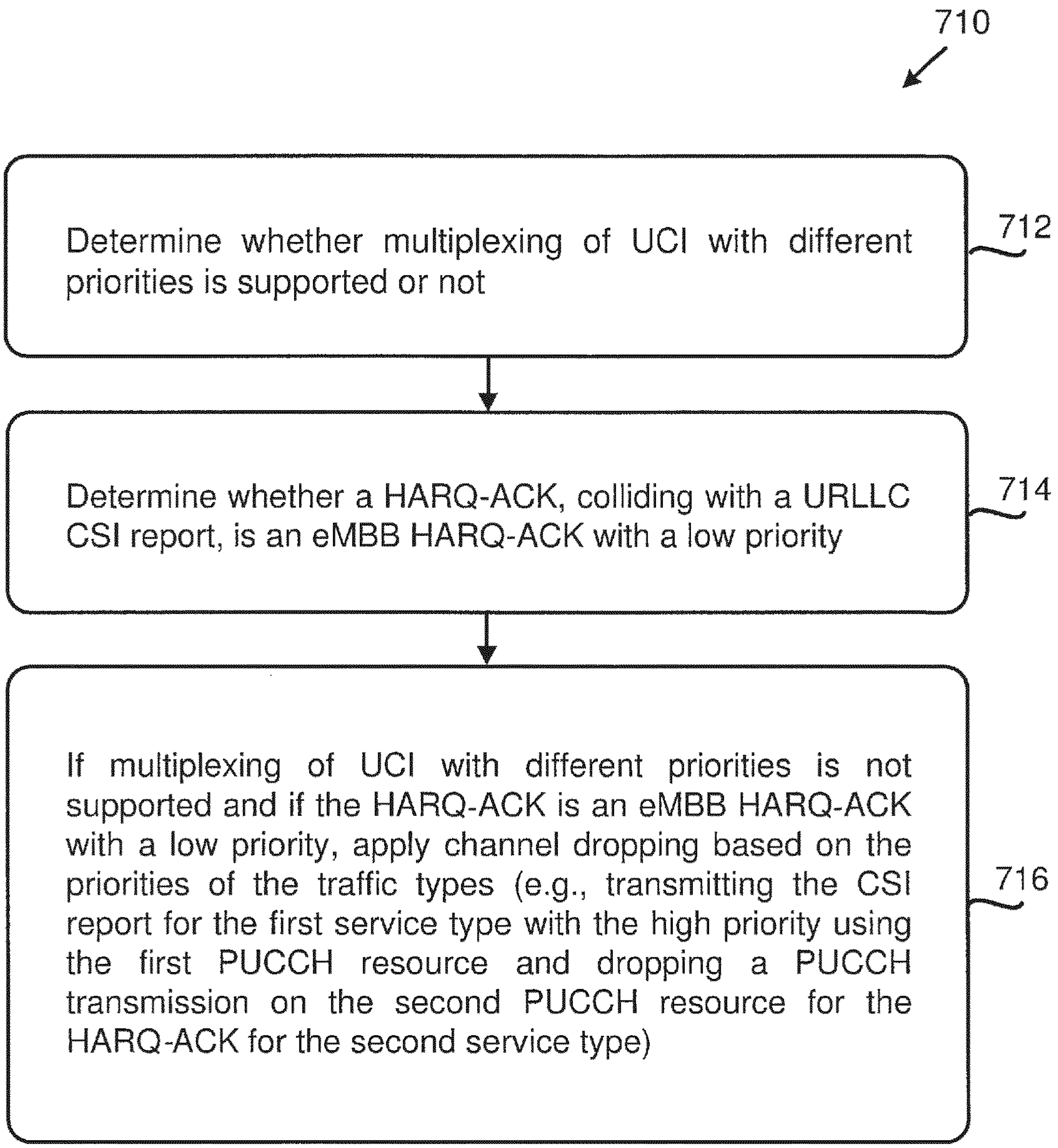
FIG. 7A illustrates a flowchart of a collision handling procedure for a channel collision between a PUCCH with a CSI report and a PUCCH for a HARQ-ACK with or without SR, according to an implementation of the present disclosure.

FIG. 7A illustrates a flowchart of a collision handling procedure for a channel collision between a PUCCH with a CSI report and a PUCCH for a HARQ-ACK with or without SR, according to an implementation of the present disclosure. In one implementation, the flowchart 710 may correspond to one of the plurality of collision handling procedures mentioned in action 410 in FIG. 4.

According to the collision handling procedure in the flowchart 710, the UE may apply UCI multiplexing or channel dropping based on certain priority rules depending on traffic types and/or channel priorities.

According to the collision handling procedure in the flowchart 710, the UE, in action 712, may determine whether multiplexing of UCI with different priorities is supported or not. In action 714, the UE may determine whether a HARQ-ACK, colliding with a URLLC CSI report, is an eMBB HARQ-ACK with a low priority.

If multiplexing of UCI with different priorities is not supported, and if the HARQ-ACK, colliding with a URLLC CSI report, is an eMBB HARQ-ACK with a low priority, the UE, in action 716, may apply channel dropping based on the priorities of the different traffic types. In one implementation, the PUCCH transmission for the traffic type with the lower priority will be dropped, and the PUCCH transmission for the traffic type with the higher priority will be transmitted. For example, a URLLC CSI or a CSI with a high priority is considered to have a higher priority than an eMBB HARQ-ACK. Thus, in the case of a PUCCH for a CSI report with a high priority collides with a PUCCH for an eMBB HARQ-ACK, the URLLC CSI PUCCH is transmitted and the PUCCH transmission for the eMBB HARQ-ACK is dropped.

Figure 7B:
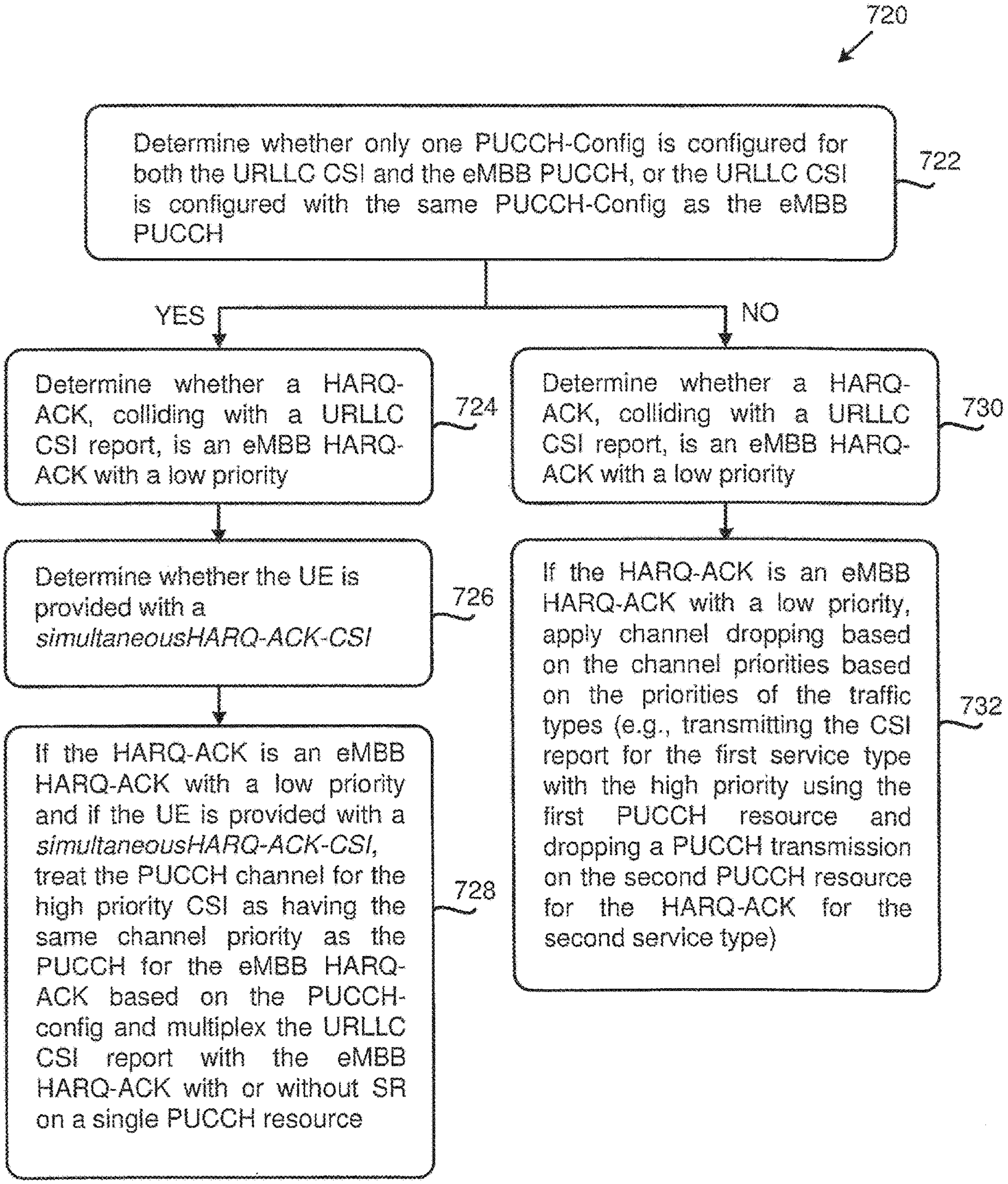
FIG. 7B illustrates a flowchart of another collision handling procedure for a channel collision between a PUCCH with a CSI report and a PUCCH for a HARQ-ACK with or without SR, according to an implementation of the present disclosure.

FIG. 7B illustrates a flowchart of another collision handling procedure for a channel collision between a PUCCH with a CSI report and a PUCCH for a HARQ-ACK with or without SR, according to an implementation of the present disclosure. In one implementation, the flowchart 720 may correspond to one of the plurality of collision handling procedures mentioned in action 410 in FIG. 4.

According to the collision handling procedure in the flowchart 720, the UE may apply UCI multiplexing or channel dropping based on channel priority from PUCCH-config of the CSI report configuration.

According to the collision handling procedure in the flowchart 720, the UE, in action 722, may determine whether only one PUCCH-Config is configured, or the URLLC CSI is configured with the same PUCCH-Config as the eMBB PUCCH. If the outcome of determination in action 722 is YES, then the UE, in action 724, may determine whether a HARQ-ACK, colliding with a URLLC CSI report, is an eMBB HARQ-ACK with a low priority. In action 726, the UE may determine whether it is provided with a simultaneousHARQ-ACK-CSI. In action 728, if the HARQ-ACK is an eMBB HARQ-ACK with a low priority and if the UE is provided with a simultaneousHARQ-ACK-CSI, the UE may treat the PUCCH channel for the high priority CSI as having the same channel priority as the PUCCH for the eMBB HARQ-ACK based on the PUCCH-config, and multiplex the URLLC CSI report with the eMBB HARQ-ACK with or without SR on a single PUCCH resource. It is noted that in action 718, the UE treat the PUCCH channel for the high priority CSI as having the same channel priority as the PUCCH for the eMBB HARQ-ACK based on the PUCCH-config itself, regardless of whether the CSI is configured as a high priority by higher layer signaling. As such, the UE may still multiplex the URLLC CSI with the eMBB HARQ-ACK on a single PUCCH resource.

If the outcome of determination in action 722 is NO, it means that separate PUCCH-Configs are configured for PUCCH with different priorities, and the URLLC CSI is configured with a different PUCCH-Config from the eMBB HARQ-ACK. Then, the flowchart 720 proceeds to action 730, where the UE may determine whether the HARQ-ACK, colliding with a URLLC CSI report, is an eMBB HARQ-ACK with a low priority.

If the HARQ-ACK, colliding with a URLLC CSI report, is an eMBB HARQ-ACK with a low priority, the UE, in action 732, may apply channel dropping based on channel priority, which may be based on the priorities of the different traffic types. In one implementation, the PUCCH transmission for the traffic type with the lower priority will be dropped, and the PUCCH transmission for the traffic type with the higher priority will be transmitted.

For example, the URLLC CSI is configured with a PUCCH-Config for URLLC or a PUCCH-Config with a high priority, that is a different PUCCH-Config from the eMBB HARQ-ACK PUCCH-Config. Then, based on the two separate PUCCH-Configs, the URLLC CSI PUCCH has a higher priority than the PUCCH for the eMBB HARQ-ACK. Thus, in the case of a PUCCH for a CSI report with a high priority collides with a PUCCH for an eMBB HARQ-ACK, the URLLC CSI PUCCH is transmitted and the PUCCH transmission for the eMBB HARQ-ACK is dropped.

In another method, channel dropping rule is always applied to give the URLLC traffic type with a high priority than the eMBB traffic type. This method does not support multiplexing of UCI with different priorities. Since the URLLC traffic type is given a higher priority than the eMBB traffic type, in a case of a PUCCH for URLLC CSI report configured with a high priority collides with an PUCCH for an eMBB HARQ-ACK with or without SR, the PUCCH for URLLC CSI is transmitted, and the PUCCH transmission for the eMBB HARQ-ACK with or without SR is dropped.

In yet another method, when there is a collision between a PUCCH with a URLLC HARQ-ACK and a PUCCH with a low priority CSI, the PUCCH transmission for the high priority HARQ-ACK is transmitted, while the PUCCH transmission for the low priority CSI is dropped. Thus, the PUCCH transmission for the low priority CSI is dropped, and only the URLLC HARQ-ACK is transmitted.

In yet another method, when there is a collision between a PUCCH with an eMBB HARQ-ACK and a PUCCH with a low priority CSI, the channels have the same priority index. The UE may multiplex the HARQ-ACK information with or without SR with the CSI report(s) in a same PUCCH if the UE is provided simultaneousHARQ-ACK-CSI. Otherwise, the UE may drop the CSI report(s) and transmit only the HARQ-ACK with or without SR in the PUCCH.

What is claimed is:

1. A user equipment (UE) comprising:

one or more non-transitory computer-readable media storing computer-executable instructions; and at least one processor coupled to the one or more non-transitory computer-readable media and configured to execute the computer-executable instructions to:

configure a Channel State Information (CSI) report for a first service type, the CSI report for the first service type being an ultra-reliable and low latency (URLLC) CSI report with a high priority;

configure a first physical uplink control channel (PUCCH) resource for the URLLC CSI report with the high priority;

configure a plurality of sets of second PUCCH resources for a Hybrid Automatic Repeat Request-Acknowledgement (HARQ-ACK) feedback for a second service type, the HARQ-ACK feedback being an enhanced mobile broadband (eMBB) low priority HARQ-ACK feedback;

determine that the first PUCCH resource for the URLLC CSI report with the high priority overlaps a second PUCCH resource for the eMBB low priority HARQ-ACK feedback;

multiplex the URLLC CSI report with the high priority and the eMBB low priority HARQ-ACK feedback with or without a scheduling request (SR) on a single PUCCH resource in the plurality of sets of second PUCCH resources in a case that:

only one PUCCH-Configuration (PUCCH-Config) is configured or the first PUCCH resource for the URLLC CSI report with the high priority is configured with a same PUCCH-Config as the plurality of sets of second PUCCH resources, the first PUCCH resource for the URLLC CSI report with the high priority overlaps the second PUCCH resource for the eMBB low priority HARQ-ACK feedback, and the UE is configured with a simultaneous HARQ-ACK and CSI (HARQ-ACK-CSI); and transmit the URLLC CSI report with the high priority using the first PUCCH resource and drop a PUCCH transmission on the second PUCCH resource for the eMBB low priority HARQ-ACK feedback in a case that more than one PUCCH-Config is configured, wherein the first PUCCH resource for the URLLC CSI report with the high priority is configured with a PUCCH-Config different from a PUCCH-Config of the plurality of sets of second PUCCH resources.

2. A gNodeB based station (gNB) comprising:

one or more non-transitory computer-readable media storing computer-executable instructions; and at least one processor coupled to the one or more non-transitory computer-readable media and configured to execute the computer-executable instructions to:

configure a Channel State Information (CSI) report for a first service type, the CSI report for the first service type being an ultra-reliable and low latency (URLLC) CSI report with a high priority;

configure a first physical uplink control channel (PUCCH) resource for the URLLC CSI report with the high priority;

configure a plurality of sets of second PUCCH resources for a Hybrid Automatic Repeat Request-Acknowledgement (HARQ-ACK) feedback for a second service type, the HARQ-ACK feedback being an enhanced mobile broadband (eMBB) low priority HARQ-ACK feedback;

determine that the first PUCCH resource for the URLLC CSI report with the high priority overlaps a second PUCCH resource for the eMBB low priority HARQ-ACK feedback;

multiplex the URLLC CSI report with the high priority and the eMBB low priority HARQ-ACK feedback with or without a scheduling request (SR) on a single PUCCH resource in the plurality of sets of second PUCCH resources in a case that:

only one PUCCH-Configuration (PUCCH-Config) is configured or the first PUCCH resource for the URLLC CSI report with the high priority is configured with a same PUCCH-Config as the plurality of sets of second PUCCH resources, the first PUCCH resource for the URLLC CSI report with the high priority overlaps the second PUCCH resource for the eMBB low priority HARQ-ACK feedback, and the UE is configured with a simultaneous HARQ-ACK and CSI (HARQ-ACK-CSI); and transmit the URLLC CSI report with the high priority using the first PUCCH resource and drop a PUCCH transmission on the second PUCCH resource for the eMBB low priority HARQ-ACK feedback in a case that more than one PUCCH-Config is configured, wherein the first PUCCH resource for the URLLC CSI report with the high priority is configured with a PUCCH-Config different from a PUCCH-Config of the plurality of sets of second PUCCH resources.

3. A method performed by a user equipment (UE), the method comprising:

configuring a Channel State Information (CSI) report for a first service type, the CSI report for the first service type being an ultra-reliable and low latency (URLLC) CSI report with a high priority;

configuring a first physical uplink control channel (PUCCH) resource for the URLLC CSI report with the high priority;

configuring a plurality of sets of second PUCCH resources for a Hybrid Automatic Repeat Request-Acknowledgement (HARQ-ACK) feedback for a second service type, the HARQ-ACK feedback being an enhanced mobile broadband (eMBB) low priority HARQ-ACK feedback;

determining that the first PUCCH resource for the URLLC CSI report with the high priority overlaps a second PUCCH resource for the eMBB low priority HARQ-ACK feedback;

multiplexing the URLLC CSI report with the high priority and the eMBB low priority HARQ-ACK feedback with or without a scheduling request (SR) on a single PUCCH resource in the plurality of sets of second PUCCH resources in a case that:

only one PUCCH-Configuration (PUCCH-Config) is configured or the first PUCCH resource for the URLLC CSI report with the high priority is configured with a same PUCCH-Config as the plurality of sets of second PUCCH resources, the first PUCCH resource for the URLLC CSI report with the high priority overlaps the second PUCCH resource for the eMBB low priority HARQ-ACK feedback, and the UE is configured with a simultaneous HARQ-ACK and CSI (HARQ-ACK-CSI); and transmitting the URLLC CSI report with the high priority using the first PUCCH resource and dropping a PUCCH transmission on the second PUCCH resource for the eMBB low priority HARQ-ACK feedback in a case that more than one PUCCH-Config is configured, wherein the first PUCCH resource for the URLLC CSI report with the high priority is configured with a PUCCH-Config different from a PUCCH-Config of the plurality of sets of second PUCCH resources.

* * * * *